United States Patent Office 2,942,406
Patented June 28, 1960

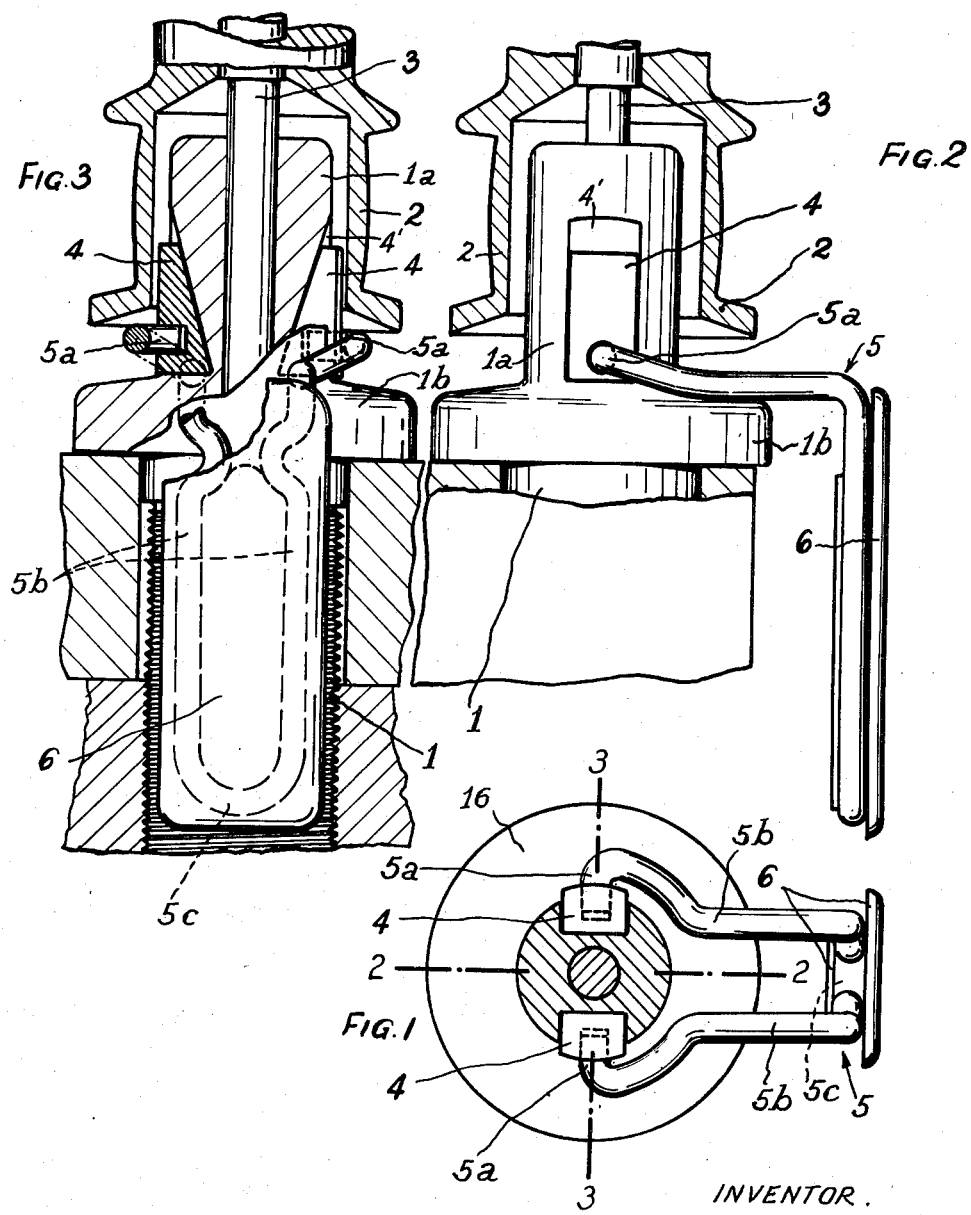

2,942,406

BRAKE FOR SPINNING AND TWINING SPINDLES

Karl Ellinger, Haus 96, Reichenberg Kreis Backnang, Germany

Filed Sept. 20, 1956, Ser. No. 611,028

3 Claims. (Cl. 57—88)

The present invention relates to and has for its object to provide improvements in a spindle brake and more particularly in such a brake for spinning and twining spindles.

Spindle brakes are known in which, for example, an internal ring is expanded, when the brake is applied, and pressed from the inside against a braking surface in a whorl socket. In other constructions, there are provided radially movable brake shoes which are moved outwardly by means of a camming arrangement. Still other spindle brakes are so constructed that two oppositely arranged brake shoes are tangentially moved, when the brake lever is applied, in order that a two-sided wedging or braking effect is obtained. All these known brakes possess certain disadvantages. Thus, they require a particularly wide braking surface of substantial diameter. Furthermore, they are not economical to manufacture and therefore relatively expensive.

It is therefore, the general object of the present invention to overcome the above described drawbacks, by providing a brake for spinning and twining spindles which comprises two wedge-shaped brake shoes which are guided in matching grooves against radial turning and axially moved on a straight line or curved surface till the movement of the whorl and with it that of the spindle is checked.

It is another object of the present invention to provide a spindle brake which is made up of a relatively small number of simple and ruggedly constructed parts providing a very reliable operation over a long period of time.

With these and other objects in view which will become apparent in the following detailed description, the present invention will be clearly understood in connection with the accompanying drawing, in which:

Figure 1 is a cross-sectional view of a spindle brake constructed in accordance with the present invention;

Fig. 2 is a longitudinal sectional view taken substantially along the lines 2—2 of Fig. 1; and Fig. 3 is a view similar to that shown in Fig. 2 but taken substantially along the lines 3—3 of Fig. 1.

Referring now to the drawing, it will be seen that the invention illustrated in Figs. 1 to 3 includes a bolster 1, having a neck portion 1a and a flange portion 1b, which supports in known manner the spindle 3 which is provided with a whorl 2. The brake is composed of wedge-shaped brake shoes 4 and a U-shaped fork 5 serving as a brake lever and formed integrally from spring wire. The U-shaped fork is composed of pin portions 5a, L-shaped legs 5b and a cross-member 5c. The brake shoes are received in oppositely disposed, wedge-shaped recesses 4' of the neck portion 1a. The horizontally extending portions of the legs 5b provide the support for the U-shaped fork 5 upon the flange 1b, while the vertical portions thereof as well as the cross-member 5c support an elongated pressure plate 6, against which the braking pressure is exerted when the brake is applied.

In the drawing hereof the U-shaped fork 5 is shown in the form of an integrally made spring-wire member, because, in this case, it can be given the spring tension necessary for enabling the brake shoes to slide into the free-wheeling position, when the fork is released from the braking pressure. As shown, the above-mentioned flange 1b, which supports the horizontal portions 5b of the fork, has a slightly sloping top. The moment pressure is exerted by the plate 6 against the vertical leg portions of the fork, while remaining in sliding contact with the sloping top surface of flange 1b, the horizontal leg portions 5b of the fork are pivoted upward about the points of support and forced apart, in opposition to the tension which is thereby exerted by the cross-member 5c of the fork. As soon as the pressure against plate 6 ceases, the tension of the cross-member 5c forces the horizontal leg portions 5b back into their original proximity which causes a return of the brake shoes into their free-wheeling position. Such form of the U-shaped fork 5 is not essential, however. It is, therefore, understood that the brake-shoe springing may, by way of example, also be made in the form of a clamp, and the fork, by way of example, in the form of two or more stamped sheet-metal parts without departing from the invention as defined in the claims.

While I have disclosed one embodiment of the present invention, it is to be understood that this embodiment is given by example only and not in a limiting sense, the scope of the present invention being determined by the objects and the claims.

What is claimed is:

1. A spindle brake for spinning and twining spindles provided with a whorl and a bolster, said bolster having oppositely disposed axially extending grooves, the latter having wedge-shaped surfaces, a pair of oppositely disposed brake shoes being of wedge-shape complementary to said wedge-shaped surfaces of said grooves and movable in the direction of the longitudinal axis of said bolster in said grooves from a free-wheeling position into a braking position acting against said wedge-shaped surfaces and at diametrically opposite points of the inner face of said whorl, and a fork moving axially said brake shoes in and out, respectively, of a braking position.

2. The spindle brake, as set forth in claim 1, wherein said fork is formed integrally from spring wire the ends of which are angularly bent and disposed diametrically in bores of said brake shoes, said fork being a return spring for said brake shoes, said spring-acting transversely to said spindle, and the legs of the handle portion of said fork constituting said return spring.

3. The spindle brake as set forth in claim 2, which includes a pressure plate which is a part of said handle and inserted between said legs of said spring and held therebetween.

References Cited in the file of this patent

UNITED STATES PATENTS

| 701,138 | Boyd | May 27, 1902 |
| 2,657,523 | Kooistra | Nov. 3, 1953 |

FOREIGN PATENTS

| 40,974 | Switzerland | Aug. 5, 1907 |
| 461,616 | Germany | June 25, 1928 |